United States Patent [19]

Thomsen et al.

[11] Patent Number: 4,700,218
[45] Date of Patent: Oct. 13, 1987

[54] AUTOMATED SYSTEM FOR ADJUSTMENT OF THE WHITE BALANCE IN A SIGNAL DISPLAYED ON THE SCREEN OF A COLOR CATHODE RAY TUBE

[75] Inventors: Paul M. Thomsen, Ontario; Dan N. Ciocan, Rowland Heights, both of Calif.

[73] Assignee: Conrac Corporation, Stamford, Conn.

[21] Appl. No.: 723,032

[22] Filed: Apr. 12, 1985

[51] Int. Cl.[4] .............................................. H04N 9/73
[52] U.S. Cl. ........................................ 358/29; 358/10
[58] Field of Search ................................... 358/10, 29

[56] References Cited

U.S. PATENT DOCUMENTS

| | | | |
|---|---|---|---|
| 3,479,448 | 11/1969 | Kollsman | 358/10 |
| 3,573,352 | 4/1971 | Fujita | 358/29 |
| 3,962,722 | 6/1976 | Ciciora | 358/10 |
| 4,123,775 | 10/1978 | Bugni | 358/10 |
| 4,160,264 | 7/1979 | Hailey et al. | 358/29 |
| 4,274,107 | 6/1981 | Tamura et al. | 358/29 |
| 4,314,272 | 2/1982 | Miyaji et al. | 358/10 |
| 4,340,904 | 7/1982 | Wingrove | 358/10 |
| 4,379,292 | 4/1983 | Minato et al. | 340/701 |

Primary Examiner—John W. Shepperd
Attorney, Agent, or Firm—Kendrick, Netter & Bennett

[57] ABSTRACT

An automated system for adjustment of the white balance in a signal displayed on the screen of a color CRT includes a device attachable to the screen of a color CRT for detecting a first value for at least one of the following signal characteristics: Contrast, brightness, red/green/blue lowlights and red/green/blue highlights in a signal displayed on the screen; a mechanism for changing the first value to a second value within the control range of the CRT; a mechanism for detecting such a second value; a mechanism for storing at least one value within the control range of the CRT for at least one of the foregoing signal characteristics; a mechanism for recovering any such stored value; and a mechanism for conforming the value of one or more of such signal characteristics to a stored value.

5 Claims, 6 Drawing Figures

4,700,218

AUTOMATED SYSTEM FOR ADJUSTMENT OF THE WHITE BALANCE IN A SIGNAL DISPLAYED ON THE SCREEN OF A COLOR CATHODE RAY TUBE

This invention relates to a system and a method for adjusting the white balance of a signal displayed on a color cathode ray tube (CRT) to a desired white level, and for matching the white balance of signals displayed on two or more different cathode ray tubes to one another.

The new system for producing, precisely and accurately, the desired white color balance in a signal displayed on a color CRT comprises means attachable to, and detachable from the screen of such tubes; means for detecting a first value for at least one member of the group consisting of signal contrast, signal brightness, red/green/blue signal lowlights and red/green/blue signal highlights in a signal displayed on the screen of a CRT; means for changing said first value to a second value within the control range of said CRT; means for detecting said second value; means for storing at least one value within the control range of said CRT for at least one member of said group; means for recovering any stored value; and means for conforming the value of at least one member of said group to said stored value.

In preferred embodiments, the new system comprises means for detecting first values for two or more members of the group consisting of signal contrast, signal brightness, red/green/blue signal lowlights and red/green/blue signal highlights, and preferably for detecting three or all four of these signal characteristics. Preferred embodiments of the new system also include means for changing two or more detected first values to second values within the control range of the cathode ray tube; means for detecting said two or more second values; means for storing two or more of such values within the control range of the CRT; means for recovering two or more of the values from storage; and means for conforming the value of two or more of these signal characteristics to stored values for them.

The new method for automated adjustment of the color balance in signals displayed on CRT's comprises: detecting a first value for at least one member of the group consisting of signal contrast, signal brightness, red/green/ blue signal lowlights and red/green/blue signal highlights in a signal displayed on the screen of a CRT; changing said first value to a second value within the control range of the CRT; detecting said second values; storing at least one value within the control range of the CRT for at least one member of said group; recovering one or more of the stored values; and conforming the actual value of at least one member of said group to a stored value.

In preferred embodiments, the new method comprises detecting first values for two or more of the signal characteristics in the group consisting of signal contrast, signal brightness, red/green/blue signal lowlights and red/green/blue signal highlights; changing two or more of such first values to second values within the control range of the CRT; detecting such second values; storing values within the control range of the CRT for at least two members of said group of signal characteristics; recovering two or more of such values from storage; and conforming the actual values of at least two of the signal characteristics in the group to stored values.

One embodiment of our new system includes a color photometer that is attachable to, and detachable from the screen of a color CRT. The photometer includes a probe equipped with photocells having filters over them. When a signal, preferably a test signal such as a "window" signal, is displayed on the screen of the CRT at the place where the probe is attached to the CRT, the filtered photocells in the probe measure and convey the x, y coordinates and brightness of the displayed signal. This analog data is converted to digital data by an A/D converter so that the data can be conveyed, preferably simultaneously, to a data processor.

The data processor receives and processes data from the photometer. The data processor passes signals to the CRT that adjust the CRT controls, as necessary, to produce the desired white balance in a signal displayed on the CRT screen. The processor also controls, stores and manipulates signals containing data from control means for the CRT.

Preferred embodiments of our new system also include control means for changing and adjusting the following characteristics of signals displayed on the screen of a CRT: contrast, brightness, red/green/blue signal highlights and red/green/blue signal lowlights. Optionally, but preferably, the new system includes means such as light-emitting diodes for displaying the status of the control means.

Our new system can better be understood from the drawings in which.

Figure 3:
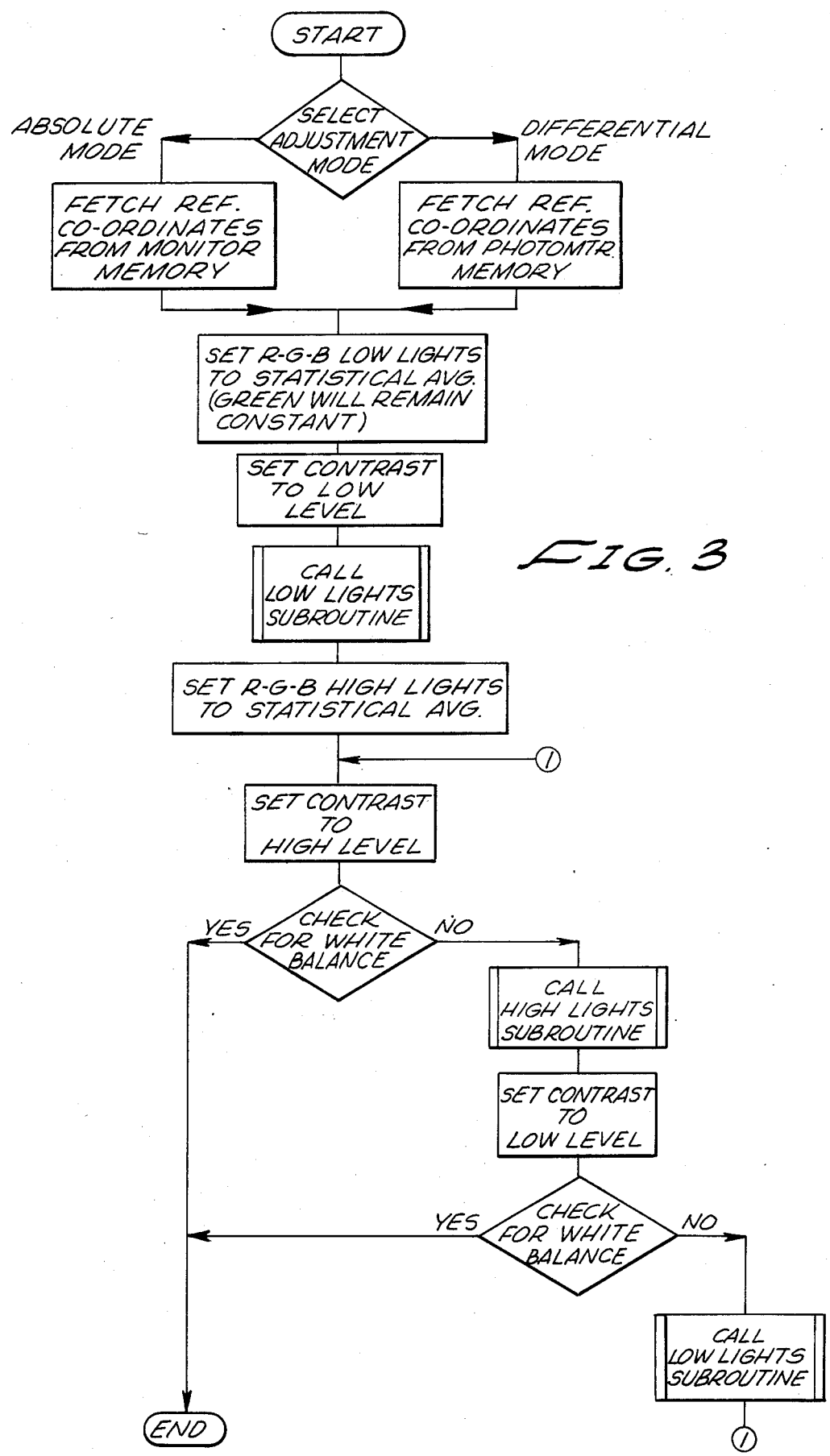
Figure 4:
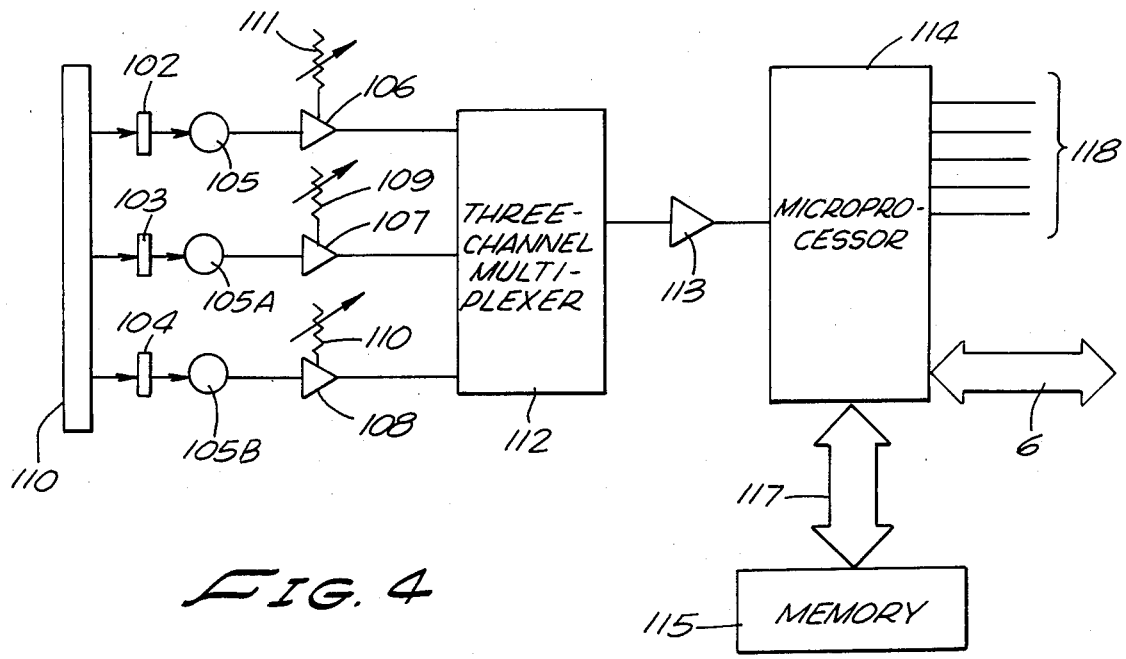

FIGS. 3/1, 3/2, 3A and 3B are a diagrammatical flowsheet showing how our system permits adjustment, manually or automatically, of one or more values for signal contrast, more values for signal contrast, signal brightness, red/green/ blue signal highlights and red/green/blue signal lowlights of signals displayed on the screen of a color CRT; and FIG. 4 is a block function diagram of the preferred embodiment of the photometer in our new system.

Figure 1:
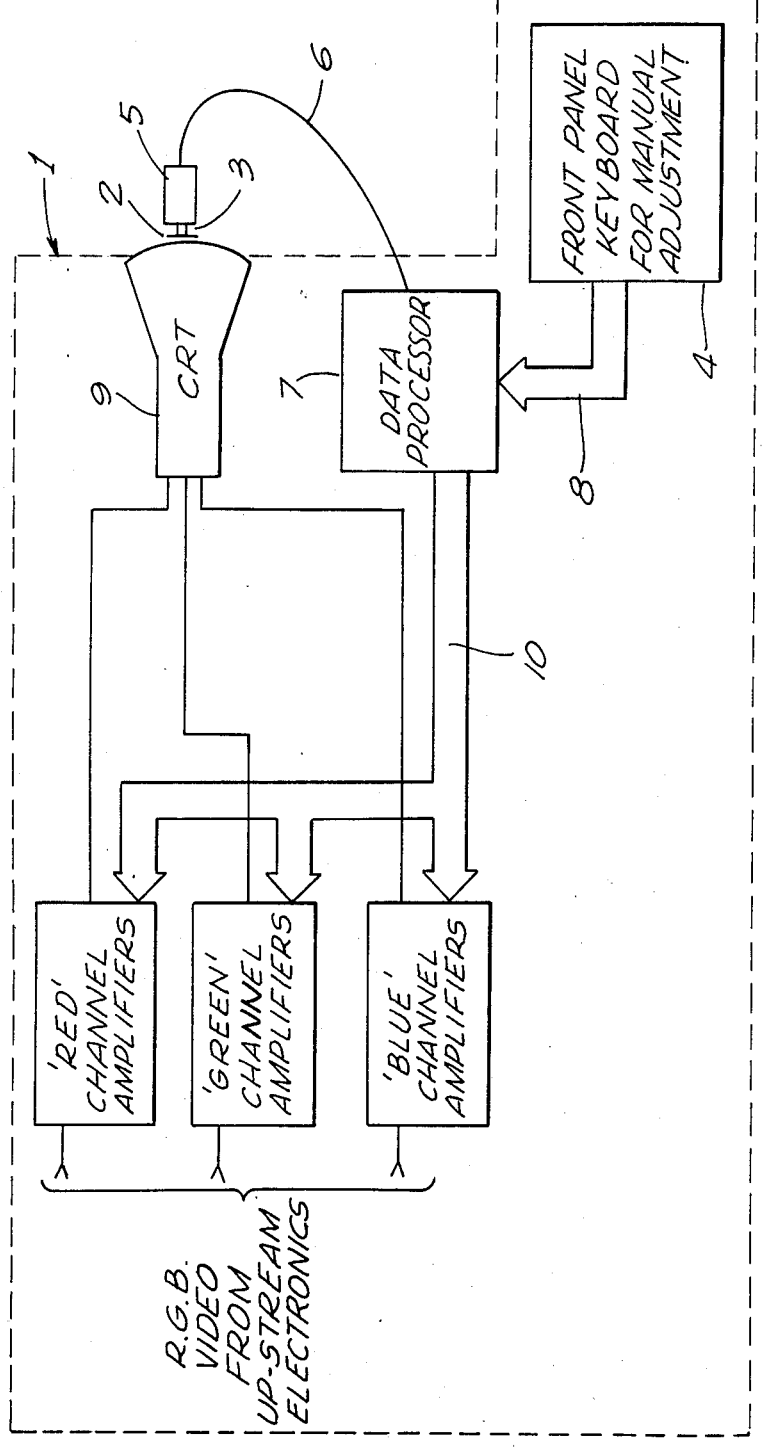
FIG. 1 is a schematic block diagram of our new system.
Figure 2:
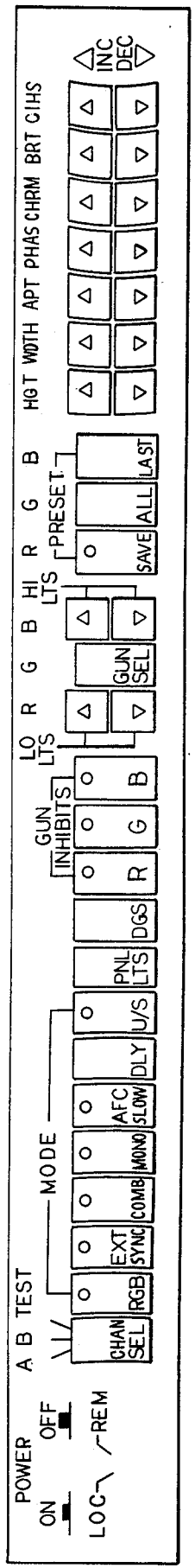
FIG. 2 is a diagram of the preferred embodiment of the control panel in FIG. 1.

FIG. 1 shows CRT 9 mounted in housing 1. Housing 1 includes control panel 4. Control panel 4 includes control means for increasing or decreasing the value (or level) of the contrast, brightness, red/green/blue highlights and red/green/ blue lowlights of a signal, such as a "window" signal, displayed on the screen of CRT 9.

Color photometer 5 is linked to the screen 9 of the CRT by signal path 3 connected to the photometer 5 at one end and to probe 2 at the other end. Probe 2 is attachable to and detachable from the screen of CRT 9, and includes two or more photocells with filters over them.

Color photometer 5 is linked to data processor 7 by path 6. Processor 7 is linked to the control panel of CRT housing 1 by path 8, and to control electronics via path 10.

Probe 2 is attached to the screen at a location where the "window" signal appears. Photometer 5 receives analog data representing the value of the contrast, brightness, red/green/blue highlights and red/green/blue lowlights, of the signal, converts the data to digital signals, and delivers them to data processor 7. Processor 7 conveys these data to CRT 1 on path 8 for adjustment of display electronics.

Photometer 5 intercepts light impulses emitted by CRT 9's phosphors, converts these light impulses into digital data representing the amount of red, green and blue light, respectively, and either stores this data in memory, or outputs this data to CRT 9.

Referring to FIG. 4, emitted light from the screen of CRT 9 enters photometer 5 through diffusing element 101. Red light, and only red light, passes through filter 102; green light, and only green light, passes through filter 103; and blue light, and only blue light, passes through filter 104. Thus, each of phototransistors 105, 105A and 105B is stimulated only by the light color that passes through the related filter 102 or 103 or 104.

Amplifiers 106, 107 and 108 increase the amplitude of the electrical signals from phototransistors 105, 105A and 105B. Potentiometers 109, 110 and 111 provide gain adjustment for each "channel." The outputs of amplifiers 106, 107 and 108 are connected to a 12-bit analog-to-digital converter 113 via a three-channel multiplexer 112. Microprocessor 7 controls the operation of multiplexer 112.

The 12 data bits from converter 113 pass to microprocessor 114 which stores the data in memory 115 via path 117, and may output the data to monitor control electronics via path 6. Microprocessor 7 is controlled by either switches on photometer 5 itself or, remotely, by the monitor via path 6. Manual control using these switches is effected via path 118, which connects the switches with microprocessor 114.

The switches on photometer 5 are designated "select," "measure," "set up" and "local/remote," and effect the following functions. With the "local/remote" switch in the local position, with engagement of the "select" switch passes a signal on path 118 to microprocessor 114 to call for data representing the lowlights or highlights value of a signal on the screen of a monitor, or to calibrate photometer 5. In calibration mode, the photometer detects a "darklight" value, i.e., a value detected when little or no light is passing through diffusing element 101, for purposes of providing a baseline value against which to measure the lowlights or highlights value of a signal displayed on the screen of CRT 9.

Engagement of the "measure" switch passes a signal on path 118 to processor 114, which executes measurement of either the lowlights or highlights value of a signal, or executes the calibration of photometer 5, as described above.

With the "local/remote" switch in either the local or the remote position, engagement of the "set up" switch passes a signal on path 6 to microprocessor 7 to initiate and carry out the functions of this new system, as described below in detail.

By appropriate movement of the controls on panel 4, the value, or level, of one or more of the signal characteristics can be increased or decreased from the values probe 2 has detected. The screen of CRT 9 and/or control panel 4 will indicate that the desired value of the characteristic in the signal has been attained.

One or more, and preferably all of the desired values for contrast, brightness, red/green/blue highlights and red/green/blue lowlights of the displayed signal can be stored in memory for the system. These stored values can then be recovered from memory, and used to change one or more signal characteristics from their actual, detected values of signals displayed on the screen of CRT 9 if the stored values are within the control range of the CRT.

The new system has the unique advantage that the desired values of the four signal characteristics of a signal displayed on a first CRT can be carried to, and reproduced in, a signal displayed on a second CRT. The system works best where the second CRT has substantially the same phosphor type as the first CRT and where the desired values are within the control range of the second CRT. CRT's have substantially the same phosphors where the color coordinates of the phosphors in each CRT are within a specified range of tolerance, preferably within about ±0.005 CIE units.

To achieve this reproduction on a second CRT, the desired values of one, two, three or all four of the signal characteristics of a signal displayed on a first CRT are stored in the memory of our system. Photometer probe 2 is detached from the screen of CRT 9, and attached to the screen of a second CRT. The desired values for the one, two, three or four signal characteristics are recovered from memory, and are used to change the same characteristics of a signal displayed on the screen of the second CRT to the stored, recovered values. In this way, the desired signal characteristics from a signal displayed on the screen of the first CRT can be matched to signals displayed on a second or several additional CRT's reliably, reproducibly and quickly.

Referring now to the flowsheet in FIG. 3, our system first calls upon the user to select the adjustment mode desired, either the absolute mode or the differential mode. In the absolute mode, our system obtains the desired reference coordinates from the CRT memory. In the differential mode, our system obtains the desired reference coordinates from the photometer memory. (The photometer would have received these coordinates from a signal displayed on the screen of a first CRT. A user of our system in the differential mode would then match the signal displayed on a first CRT to a second, or other CRT, of substantially the same phosphor type as the first CRT.)

Our system then sets the red/green/blue lowlights to the statistical average of the highest and lowest values they can have. Thereafter, the value for green remains constant.

Next, our system sets the contrast in the signal displayed on the CRT to the lowest level that the photometer can detect (approximately three foot-Lamberts). Then, the system goes to the lowlights subroutine illustrated in FIG. 3A.

Figure 3A:
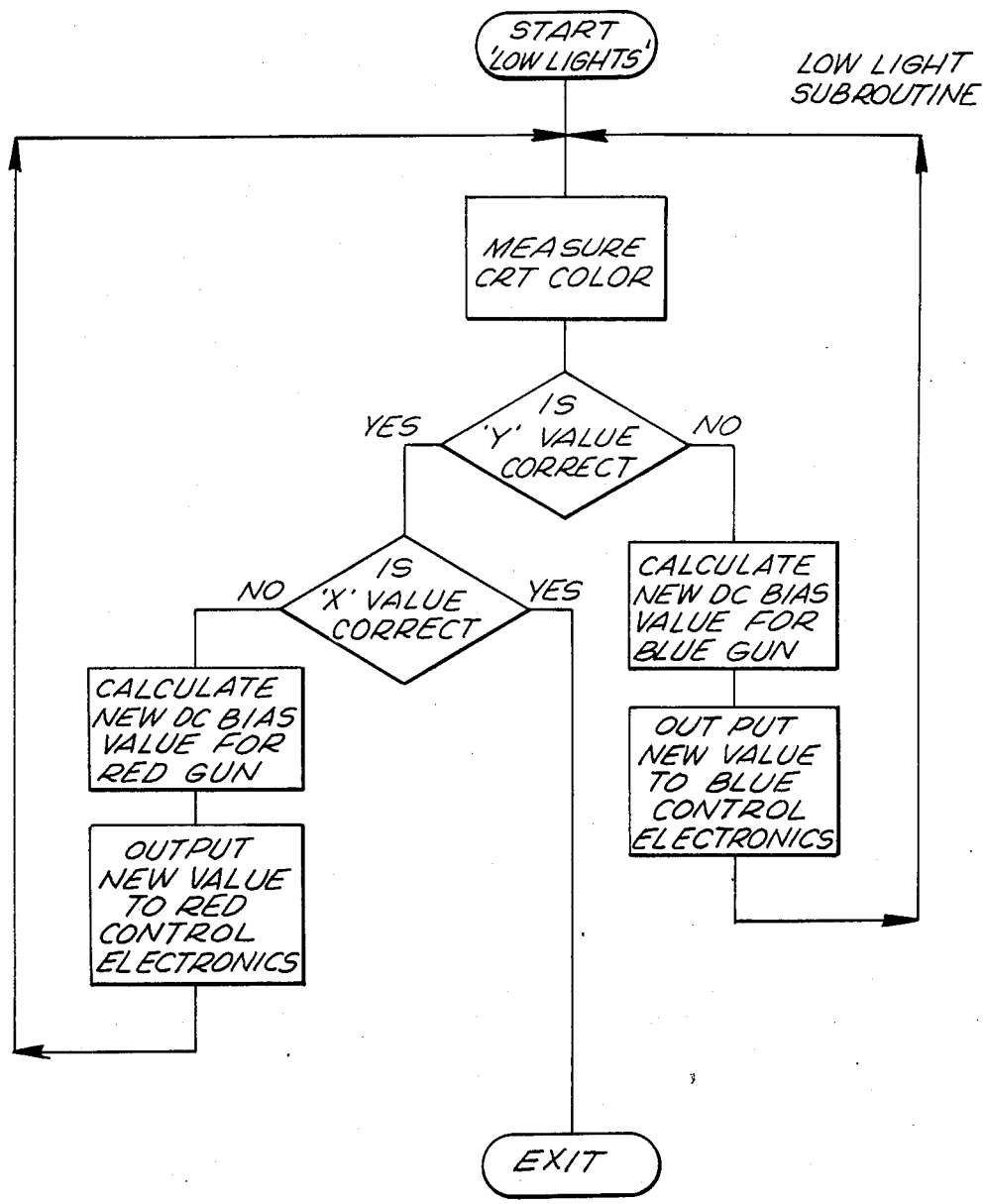

As FIG. 3A shows, the system first adjusts the DC bias on the electron gun of the CRT that controls the blue content of the signal displayed on the CRT, and measures the blue content of the signal, denoted the Y value in the flowchart, and adjusts the blue content until the signal has the desired blue content. Thereafter, the system adjusts the DC bias on the electron gun that controls the red content of the signal displayed on the CRT, measures the red content of the signal, and adjusts the red content of the signal, called the X value, until the red content matches the desired X coordinate.

Thereafter, the lowlight subroutine checks the signal for the desired white balance. If the signal has the desired white balance, the system exits the lowlights subroutine. If the signal does not have the desired white balance, the system readjusts the Y value for blue content, and then the X value for red content, again checks the white balance, and then adjusts the blue and red values, as necessary, until the correct white balance is obtained.

Figure 3B:
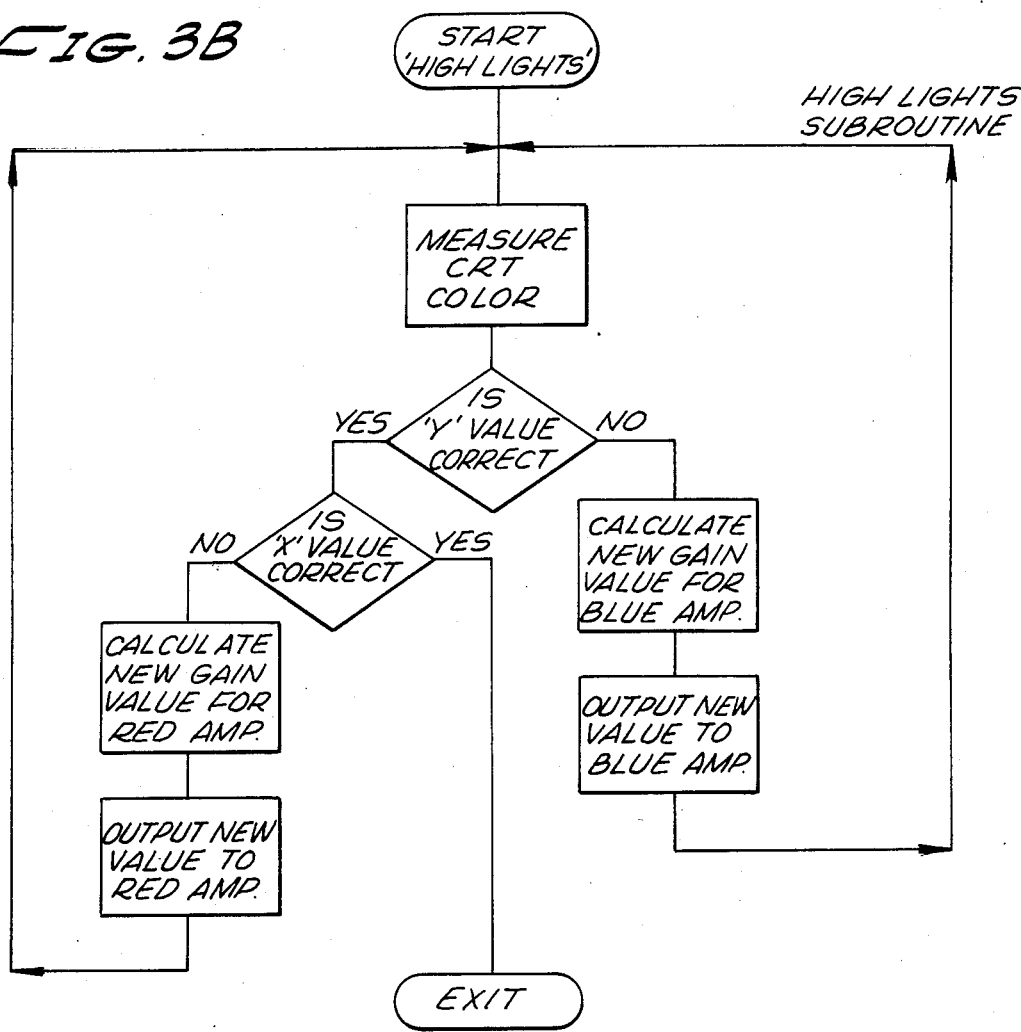

After the system exits the lowlights subroutine, the system then sets the contrast in the signal displayed on the CRT to the highest level that the photometer can detect (approximately 30 foot-Lamberts). Again, the system checks the signal to determine whether it has the desired white balance. If it does, the system exits the routine. If it does not, the system goes to the highlights subroutine, illustrated in the flowsheet on FIG. 3B. The highlights subroutine is substantially the same as the lowlights subroutine.

In the highlights subroutine, the system adjusts the blue content of the signal, measures the blue content, and determines whether or not the blue content, called the Y value, is correct. If it is, the system then adjusts the red content of the signal to the desired value, and checks the signal for white balance, all as described in connection with the low-lights subroutine. Once the desired highlights content of the signal has been established, the system returns the contrast to low level, and again checks the white balance of the signal on the CRT. If the white balance is the desired value, the system exits the routine. If not, the system again calls up the lowlights subroutine, and repeats that subroutine as described above. A number of lowlight, highlight adjust iterations may be necessary to obtain the desired results.

What is claimed is:

1. A system for controlling the color balance of a color CRT, said color CRT including amplifier means for the color red including means for controlling the bias and gain of said amplifier, amplifier means for the color green including means for controlling the bias and gain of said amplifier, and amplifier means for the color blue including means for controlling the bias and gain of said amplifier, said system comprising: means for generating and displaying a test signal on the screen of said color CRT including means for switching the video level of the test signal from values representing lowlight values to values representing highlight values and vice-versa; means attachable to, and detachable from the screen of said color CRT for detecting the amplitudes of red light, blue light and green light in said test signal; means for storing at least one group of values representing the desired color balance of said test signal or the desired color balance of a test signal in another color CRT; means for recovering at least one group of values from said storage means; means to set the bias and gain of the amplifier for the color green to predetermined, desired values; means for adjusting the bias on the red and blue amplifiers to produce the recovered values for red-to-green and blue-to-green lowlight ratios in said test signal; means for adjusting the gain of the red amplifier and the blue amplifier to produce the recovered values for red-to-green and blue-to-green highlight ratios in said test signal; and means for alternately and iteratively setting the video level and adjusting bias and gain on the red and blue amplifiers whereby a desired white balance in said tests signal can be produced.

2. The system of claim 1 wherein the storing means comprises memory means within monitor means that include said color CRT.

3. The system of claim 1 wherein the storing means comprises memory means within said detecting means.

4. A system for controlling the color balance of a color CRT, said color CRT including amplifier means for the color red, amplifier means for the color green, and amplifier means for the color blue, said system comprising: means for generating and displaying a test signal on the screen of said color CRT including means for switching the video level of the test signal from values representing lowlight values to values representing highlight values and vice-versa; means attachable to, and detachable from the screen of said color CRT for detecting the amplitudes of red light, blue light and green light in said test signal; means for storing at least one group of values representing the desired color balance of said test signal or the color balance of the test signal in another color CRT; means for recovering said at least one group of values from said storage means; means to set the bias and gain of the amplifier for one of the colors selected from red, green and blue to predetermined, desired values; means for adjusting the bias on the amplifiers for the two other colors to produce the recovered values for lowlight ratios of one of the two other colors to said first color and for the second of the two other colors to said first color in said test signal; means for adjusting the gain of the amplifiers for the two other colors to produce the recovered values for highlight ratios of one of said two other colors to said first color and the second of said two other colors to said first color in said test signal; and means for alternately and iteratively setting the video level and adjusting bias and gain on the amplifiers for said two other colors whereby a desired white balance in said test signal can be produced.

5. A method for controlling the color balance of a color CRT comprising generating and displaying a test signal on the screen of said color CRT; detecting the amplitudes of red light, blue light and green light in said test signal; recovering from storage at least one group of values representing the desired color balance of said test signal or the desired color balance of a test signal in another color CRT; setting the bias and gain of the amplifier for one of the colors red, green or blue to desired values; setting the video level of the test signal to a value representing lowlight values; adjusting the bias on the other two of the three color amplifiers to produce the recovered values for lowlight ratios of the first of the two other colors to said one color and for the second of the two other colors to said one color in said test signal; setting the video level of the test signal to a value representing highlight values; adjusting the gain of the amplifiers for said other two colors to produce the recovered values for the highlight ratios of the first of said two other colors to said one color and for the second of said two other colors to said one color in said test signal; and alternately and iteratively setting the video level and adjusting bias and gain on the amplifiers for said two other colors until a desired white balance in said test signal is produced.

* * * * *